July 2, 1957 W. L. HICKS 2,797,721
VEHICLE TIRE BALLAST
Filed Oct. 22, 1954
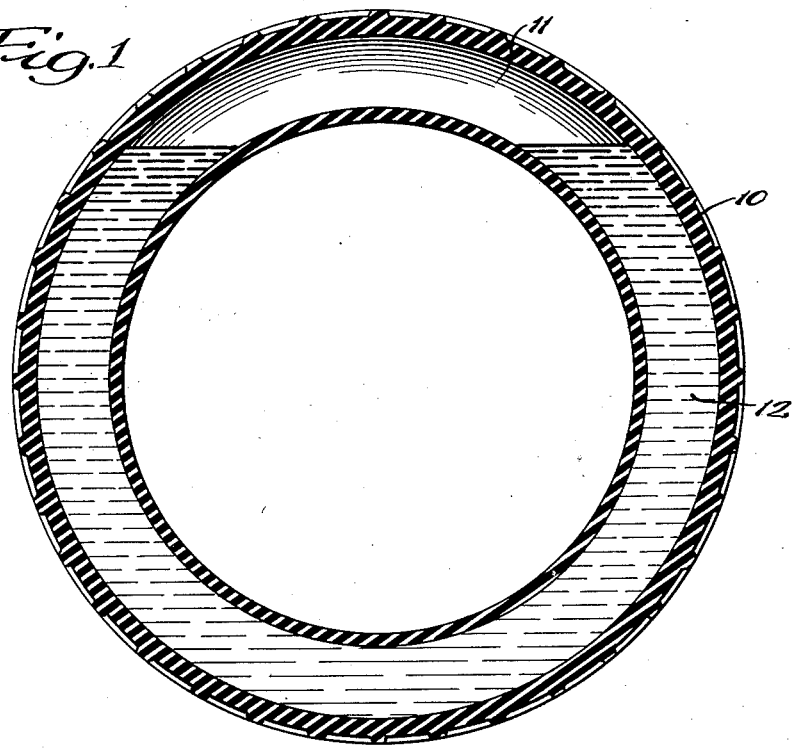
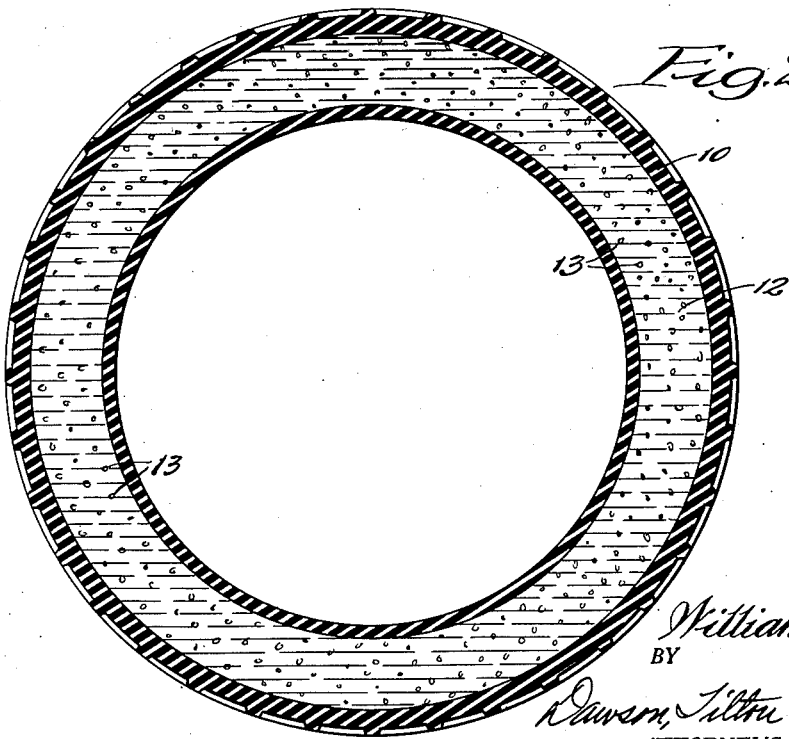
INVENTOR.
William L. Hicks,
BY
Dawson, Tilton & Graham,
ATTORNEYS.

2,797,721
VEHICLE TIRE BALLAST

William L. Hicks, Boulder, Colo.

Application October 22, 1954, Serial No. 463,853

6 Claims. (Cl. 152—330)

This invention relates to vehicle tire ballast, and to the combination of such ballast with tires. The invention is particularly useful as a composition of matter for application in the tires of a moving vehicle to provide added weight for better traction without obtaining undesirable movements, vibrations and other actions as the machine moves in forward motion.

A problem in any prime mover which is required to pull heavy loads, such as a farm tractor, has been to obtain sufficient weight upon the traction wheels to provide adequate drawbar pulling power. It is commonly known that the coefficient of friction between rubber tires and the surface over which they travel, such as an unplowed field, is about 0.5. This means that for every pound of weight on each rear wheel of a tractor, the tractor will exert a pull of not to exceed 0.5 pound in a horizontal direction. On hard surfaces, such as rough concrete, the coefficient of friction will reach as high as 0.6, while on sandy ground the coefficient of friction may drop as low as 0.25 to 0.3. Pulling power may be thus reduced very seriously in such latter operations. Where traction is very poor, with wheel type tractors, the crawler track type tractor has become popular, since its coefficient of friction is about 1.0 on many surfaces and for a given weight tractor, much heavier loads can be pulled.

To obtain added weight on the rear wheels of a farm or industrial tractor, it has been common practice to add cast iron weights to the rear wheels, or, alternatively, to pump liquid into the tires. Calcium chloride and similar salts have been added to water and the mixture has been pumped into the tires to increase the weight of the tires, the salts serving to increase the specific gravity of the solution used and also to prevent freezing of the liquid. However, it has been found that the use of such liquid mixtures or solutions, when introduced into the tires, bring about undesirable movements and vibrations, sometimes called "loping," in the wheel operation. The low viscosity liquid moves back and forth easily in the tire while in operation, producing surging movements which bring about an unbalanced dragging or loping movement. These undesirable side actions reduce the power and smooth operation of the tractor.

When mounting tires in which liquid ballast is to be used, it has been the common practice to use an inner tube within the casing to hold the air as well as the liquid ballast. I have discovered that the tire may be mounted without the tube, and when the increased viscosity liquid ballast of this invention is added to the mounted casing which is in an upright position, its weight pushes the sidewalls of the tire out against the rim of the tire and because of its viscosity acts as a sealing medium at this point, permitting the tire to be filled with air without a conventional tube to retain the air, and that over extended periods of use, negligible amounts of air are lost.

I have discovered that the undesirable unbalanced action of the liquid-weighted tire can be overcome through the use of liquids having increased viscosity. The increased viscosity may be produced by selecting heavy liquids having initially desired high viscosities, or by adding to heavy liquids the viscosity-increasing components. As a result of the increased viscosity of the liquid, the jerkiness or loping action of the tractor is eliminated and there is a smooth flow of power in the operation of the tractor.

An object of the invention is to provide a tractor tire or vehicle tire partially filled with a liquid having a viscosity which eliminates the jerky or loping action heretofore obtained with filled tires. A further object is to provide a composition of matter within the tire of a vehicle for providing added weight thereto while eliminating undesirable side movements, vibrations, etc. A still further object is to provide in a tire a relatively high viscosity liquid supplying weight to the tire while leaving an air chamber or air cushion in the tire, the viscosity of the liquid being effective in producing a smooth operation of the tire as power is applied thereto.

Another object is to provide a liquid ballast having a viscosity of over 300 cps. and not to exceed 10,000 cps. absolute viscosity when measured at 70° F.

Another object of this invention is to provide a liquid ballast of a viscosity within the above range which when added to a tire casing and mounted on a tire rim without a tube and with a tubeless valve stem in the rim, will serve as a liquid sealing medium at the junction between the bead of the tire and the metal rim, serving to reduce loss of air when operated at normal operating air pressure. Other specific objects and advantages will appear as the specification proceeds.

The tire may be filled to 90% of its content, leaving a 10% air cushion. With some tires and certain liquids, I prefer to have the tire 75% full, while with other tires or other liquids, the liquid content may be greater or less. I prefer to leave at least 10% of the space within the tire as an air chamber or air cushion, to give the effect of a pneumatic tire.

In the high speed operation of a tractor or other rubber tired vehicle, the tires of which contain a solution such as calcium chloride in water, the liquid, if it could be observed through the walls of the tire, would tend to remain below the air space in the top of the tire. While turning, the liquid, being of low viscosity and free flowing, tends to flow within the wheel, leaving a void at the top of the wheel. This continual flow gives the rocking or jerking action, producing the imbalance and vibration which has been referred to above. By providing a liquid which has a viscosity within the limits given, the liquid then tends to roll with the tire and prevents the splash and rocking within the tire which causes the unbalanced conditions.

While I am unable to explain with certainty the different forces that enter into the the resulting smooth operation of the tire by reason of the use of the higher viscosity liquid, it may be that the following is accurate. I believe that, in operation, the higher viscosity liquid tends to follow the tire with less resistance and internal friction and in the tire containing, say, 90% of its volume as liquid of a higher viscosity and 10% of its volume as air, the air becomes entrained as a dispersion within the liquid, causing the tire to be filled throughout with a frothy liquid giving a balanced tire under operating conditions. Further, I believe that the entrained air within the liquid gives a pneumatic, compressible effect to the liquid air mixture, and this gives better riding qualities to the tractor or other motor vehicle as well as reducing danger from damage when the tire strikes objects such as stones or other obstructions. Whatever be the explanation or theory, it is true that the higher viscosity liquid eliminates the undesirable vibrations and jerky action which has heretofore attended the use of filled tires containing the low viscosity liquid mixtures.

More specifically, I have discovered that barium sulphate, commonly referred to as barytes, is highly effective in a liquid dispersion as a ballast in tires by reason of its high specific gravity and high bulking value in a liquid medium, while at the same time supplying a very heavy weight to the tire. Commercial barytes consist of at least 85% barium sulphate as a natural mineral, ground and pulverized to a powder, of which 90% passes 250 mesh. Such a product in a liquid dispersion has been found to be highly effective as a ballast in tires.

I have further found that barytes dispersions can be even improved as a tire ballast by adding thereto viscosity-increasing agents. Further, I have found that other high bulking mineral pigments, such as iron oxide, lead carbonate, lead oxide, zinc oxide, clays, etc., may be used in place of barium sulphate and in combination with viscosity control or viscosity-increasing agents.

The invention may be illustrated by the following specific examples, in which the parts are set out by weight:

Example I

A tractor tire is filled to a level where the tire is 75% full with 300-mesh commercial barytes, water, and a viscosity increasing agent, the proportion being 400 parts of water and 600 parts of 300-mesh commercial barytes and 4 parts of unmodified pre-cooked cornstarch. When this material was pumped into a tractor tire to the extent indicated, the tractor tire operated very smoothly, indicating a balanced tire, and there seemed to be practically no loping or jerking due to the splashing of the liquid within the tire. Similarly, when the solution was pumped into a tractor tire to the point of 90% of its capacity, the tire operated very smoothly, indicating a balanced tire, and in sharp contrast to a tire having a low viscosity liquid therein.

This same mixture was pumped into a light truck tire filling it to 75% of its capacity without an inner tube making it a tubeless tire. When this tire was subsequently inflated to 30 lbs. air pressure, it was observed that the liquid of this example provided a sealing medium between the tire bead and the rim of the wheel, preventing leakage of air out of the tire at this point. When operated at speeds of up to 400 R. P. M., the tire operated in a balanced condition.

Example II

A liquid with increased viscosity was prepared by mixing together 263 parts of water, 4.5 parts of an unmodified pre-cooked cornstarch, and 70 parts of calcium chloride. To increase the weight per gallon of this liquid, 664 pounds of 300-mesh commercial barytes was added and mixed into a smooth slurry. The composition made by this example had a higher viscosity than water and calcium chloride solutions. The liquid slurry was pumped into a tractor tire to the level where the tire was 75% full, to produce much additional weight within the tire and resulting in increased traction. The increased viscosity of this liquid over water and solutions of calcium chloride gave a much smoother operation to the tractor due to the reduced splashing of the liquid within the tire.

Example III

A composition was prepared using 400 parts of water, 3 parts of carboxy methyl cellulose, and 600 parts of barytes. This liquid was pumped into a tractor tire, and the same improved operation described in Examples I and II was obtained. Since the mixture did not contain an anti-freeze salt, the tires could be used only in a nonfreezing climate, and this is also true of the product described in Example I. It will be understood that an anti-freeze salt may be added to the products.

Example IV

A liquid slurry with increased viscosity was prepared using 263 parts of water, 19 parts of fuller's earth, 70 parts of calcium chloride and 664 parts of barytes. The liquid slurry was pumped into a tractor tire and smooth operation was obtained without evidence of jerky or irregular action or vibration as when the same tire was filled with a low viscosity liquid such as calcium chloride solution.

Example V

A liquid slurry with increased viscosity was prepared using 263 parts of water, 18 parts of fuller's earth, 70 parts of calcium chloride, and 664 parts of iron oxide pigment. The slurry was pumped into a tractor tire, the tire filled with the same to the 75% level, and in operation the tire had the smooth movement described in the preceding examples.

Example VI

A composition was prepared employing 263 parts of water, 6 parts of bentonite, and 700 parts of barytes. The specific gravity of this mixture was 2.4, giving a weight per gallon of 20 pounds. The tire into which it was pumped held 52 gallons of liquid at 85% of its capacity. The increased weight of this composition over water permitted the weight within the tire to be increased from 434 pounds in the case where water was used, to 1040 pounds when the liquid described above was used. The viscosity of the slurry was increased by the addition of the bentonite in the mixture. With the increased traction of this added weight, the tractor exerted a considerably increased pulling effort without slippage of the tires. The increased viscosity of the mixture reduced and substantially eliminated the surging of liquid within the tire so as to give a smoother operation to the tractor even when operating it from 3 to 20 miles per hour. The tires containing the liquid of this example appeared to be balanced, indicating that the increased viscosity of the liquid permitted the air within the tire to mix uniformly with the liquid portion to provide a spongy, pneumatic, compressible liquid, uniformly spaced within the tire.

Example VII

A non-freezing liquid composition was prepared using 100 parts of calcium chloride and 250 parts of water. To this was added 9 lbs. of unmodified precooked cornstarch, which made a syrupy liquid of the calcium chloride solution. A tractor tire casing without a tube was mounted on a liquid tight rim with a tubeless valve stem mounted in the rim. Into this tubeless tire was pumped the increased viscosity liquid of this example. It was noted that the liquid formed a sealing agent between the bead of the tire and the metal rim causing the air to be held more easily than if the tire had been filled with air only. With this solution in a tractor tire to a point of 90% of its capacity, the tractor tire operated much more smoothly, indicating that it was balanced.

Example VIII

An increased viscosity solution was prepared by mixing 263 parts of water, 20 parts of unmodified cornstarch, and 70 parts of calcium chloride. To gelatinize the cornstarch, this mixture was slowly heated to 190° F., where thickening was attained. After cooling, this mixture was pumped into a tractor tire for added weight and traction. Considerable improvement in the tractor operation with better traction was noted by reason of the increased weight within the tires. The increased viscosity of the mixture gave the smooth operation described above.

A 6:00 x 16 automobile tire was filled to 75% of its capacity leaving 25% of the capacity of the tire for air. Normally it would be expected that this would provide an unbalanced tire, however when mounted on an automobile and operated at speeds up to 50 miles per hour, perfect tire balance was obtained. When the same filled tire and rim were mounted on the rear axle of a light truck, it was noted that much better traction was obtained when the truck was driven empty over snow or sand which normally provide very poor traction.

*Example IX*

A liquid composition was prepared using 800 parts of water and 20 parts of high viscosity animal glue. The mixture was heated to dissolve the glue and to provide a liquid of increased viscosity over the water alone. When pumped into a tractor tire to a point of 40% of its capacity and when the tire was operated on the tractor, a smooth, balanced operation was obtained, indicating that the increased viscosity of the glue solution permitted the 60% of air to whip uniformly into the liquid to provide a compressible, frothy liquid within the tire rather than having the air at the top and the water at the bottom as heretofore described in connection with prior low viscosity liquids.

While in the foregoing examples, I have set forth calcium chloride as an anti-freeze material, it will be understood that sodium chloride, methyl alcohol, ethyl alcohol, or one of the various glycols may be used, with satisfactory results.

Any resilient vehicle tire may be employed, and the annular sealed chamber provided by the tire may be filled to varying extents with the mineral pigment or other ballast. For example, the tire may be filled 35% full with the liquid so as to leave a 65% air cushion, or it may be filled to 90% more or less with liquid so as to leave a relatively small air cushion. The ingredients added to the mineral or ballast may be effective not only for increasing viscosity, but also for preventing the settling out of the mineral pigment, etc. In addition to the stabilizers or water-soluble thickening materials set out, other thickening material such as polyvinyl alcohol, Kelgin, clay, soaps, etc., may be used.

The invention is illustrated by the accompanying drawing, in which—

Figure 1 is a side view of a tire partly filled with liquid, a portion of the tire being shown in section; and Fig. 2, a view similar to Fig. 1 but showing the tire filled with liquid and air bubbles and providing a balanced tire.

In the illustration given, 10 designates a tire providing an annular chamber having at the upper portion thereof an air space 11 and therebelow a liquid ballast 12. When the liquid ballast is of very low viscosity, the liquid tends to remain, with some splashing and rolling, generally in the position illustrated in Fig. 1. Fig. 2 shows the tire in a balanced condition as a result of the use of high viscosity liquid. In Fig. 2, the tire 10 has the entire annular chamber filled with liquid 12, having interspersed therein air bubbles 13. Thus, the rolling or pitching effect is avoided and a balanced tire operation is achieved.

While in the foregoing specification I have set forth specific compositions and steps in considerable detail for the purpose of illustrating embodiments of the invention, it will be understood that such details of composition and procedure may be varied widely by those skilled in the art without departing from the spirit of my invention.

I claim:

1. A ballasted vehicle tire, comprising a resilient vehicle tire having an annular sealed chamber, and a fluid ballast in said tire having a viscosity of over 300 cps. and not to exceed 10,000 cps. absolute viscosity when measured at 70° F.

2. A ballasted vehicle tire, comprising a resilient vehicle tire having an annular sealed chamber, and a fluid ballast containing barytes and having a viscosity of over 300 cps. and not to exceed 10,000 cps. absolute viscosity when measured at 70° F.

3. The combination of claim 2, in which a suspension agent is added to keep the barytes in suspension.

4. A ballasted vehicle tire, comprising a resilient tire providing an annular sealed chamber, a liquid suspension of barytes in said tire, and a thickening material for increasing the viscosity of the liquid, the ballast filling 35 to 90% of the chamber.

5. A ballasted vehicle tire, comprising a resilient tire providing an annular sealed chamber, and a fluid ballast filling said tire to the extent of 35 to 90% of the chamber, said fluid ballast having a viscosity of over 300 cps. and not to exceed 10,000 cps. absolute viscosity when measured at 70° F.

6. The combination of claim 5, in which a heavy mineral pigment is employed.

References Cited in the file of this patent

UNITED STATES PATENTS 2,417,307     Larsen _____ Mar. 11, 1947

FOREIGN PATENTS 363,298     France _____ Apr. 28, 1906
645,311     Great Britain _____ Oct. 25, 1950

OTHER REFERENCES

Automotive Industries, page 421, Sept. 25, 1937.